United States Patent Office 3,285,907
Patented Nov. 15, 1966

3,285,907
ADDUCTS OF AN ION EXCHANGE SOLID AND AN ORGANIC AMMONIUM-AZO COMPOUND AND FREE RADICALS THEREFROM
Henri G. G. Dekking, Fullerton, Calif., assignor to Union Oil Company of California, Los Angeles, Calif., a corporation of California
No Drawing. Filed Oct. 15, 1962, Ser. No. 230,670
11 Claims. (Cl. 260—192)

This invention relates to a free radical, and its precursor.

The free radical precursor of my invention comprises an adduct of an ion exchange solid and an organic ammonium-azo compound. This precursor, in the manner characteristic of organic azo compounds, readily undergoes homolytic fission to cleave the azo nitrogen carbon bonds symmetrically, liberating nitrogen and forming organic fragments which have a terminal carbon with an unshared electron in its valence shell, i.e., free radicals. The free radicals which are obtained from certain of the precursors of my invention have a greatly increased stability because adduction of the azo compound with the ion exchange solid retards the mobility of the organic fragments and prevents their recombination. Despite their retarded mobility, I have found that certain of these free radicals are highly reactive and in many instances will initiate certain reactions, such as polymerization at lower initiating conditions than will the unadducted azo or nitroso compounds.

The unique stability of the organosolid free radicals obtained in accordance with my invention is in marked contrast to free radicals heretofore sythesized, in that such free radicals are very unstable and have exceedingly short lives. Perhaps the most stable of such free radicals, triphenyl methyl, has a greatly reduced reactivity because of electron resonance in the aryl nuclei. In contrast, my free radicals are very stable, yet possess a very high activity.

Finally, the ion exchange-azo or nitroso adducts of my invention offer a promising route to the chemical bonding of solid fillers and extenders to organic polymers so as to provide a complex macro-molecule which embraces heretofore incompatible components, e.g., a clay-polyvinyl compound.

The free radical precursors of my invention comprise an adduct of an azo compound having at least one ammonium group which is bonded to an ion exchange site of an ion exchange solid. Such precursors are useful for a host of organic reactions and find their greatest utility for initiation of vinyl polymerization.

In general, any solid which undergoes an ion exchange type of reaction to form an adduct with organic ammonium or amine compounds can be used to form the free radical precursor of my invention. Generally, solids possessing an ion exchange capacity of at least about 0.1 milliequivalent per 100 grams of the solid are desired; preferably solids having ion exchange capacities of at least 10 milliequivalents per 100 grams are used. This group of solids includes various well known synthetic organic ion exchange solids such as the sulfonated polystyrene resins, sulfonated phenol formaldehyde resins, etc. Preferably, however, inorganic ion exchange solids are employed to impart solvent resistance, high temperature strength, hardness, etc., to vinyl polymers hereafter described.

Various inorganic solids possess the property of strongly absorbing organic ammonium ions by apparent chemical bonding through a base exchange reaction. These solids are commonly referred to as ion-exchange solids and include the oxides and hydroxides of alkaline earth metals, iron, aluminum, silicon, vanadium, as well as the synthetic and naturally occurring alumino-silicates, e.g., clays, zeolites, molecular sieves, etc.

The alumino-silicates are a preferred group of inorganic solids and include such zeolitic materials such as chabazite, analcite, gmelinite, faujasite, etc. Synthetic zeolites, which are obtained by heating the proper proportions of alumina and silica with an excess of sodium hydroxide and thereafter washing out excess caustic, can also be employed. The cystalline products so obtained are available commercially as the various "Molecular Sieves" 4A, 5A, 13A, 13X, 10X, etc.

Preferred alumino-silicates are the naturally occurring clays which are available having a wide variety of chemical and physical properties. For the purposes of my invention, the clays can be classified into non-swelling types and swelling or expanding lattice types.

The non-swelling types include illite having a three-layer non-expanding lattice; kaolinite, nacrite, dickite, anauxite, halloysite, endellite, etc., having a two-layer crystal; allophane, an amorphous solid; chlorite, mica, brucite, etc., having mixed layers; and attapulgite, sepiolite, polygorskite, having a chain-like or fibrous structure. In general, these clays have a low ion exchange capacity; between about 0.1 and about 50 milliequivalents per 100 grams.

The expanding lattice clays include montmorillonite, sucinite, vermiculite, nontronite, saponite, hectorite, etc., which have a three-layer crystal. These clays are commonly found in admixture in bentonite clays having an average aluminum oxide content less than about 20 percent. The bentonite clays also have a high ion exchange capacity, commonly between about 50 and 150 milliequivalents per 100 grams of air-dried clay. Swelling or expanding lattice clays are found in Wyoming, South Dakota, Montana, Utah, Nevada and California.

The aforerescribed clays and natural zeolites are usually found in a form wherein the ion exchange sites are occupied with alkali and/or alkaline earth metals. The commercially synthetic zeolites are also available with their exchange sites occupied by an alkali metal, e.g., sodium, lithium, potassium, etc.; alkaline earth metals, e.g., calcium, magnesium, etc. The clays and zeolites can be ion exchanged with an onium azo compound to form my free radical precursor or can be treated to exchange the alkali or alkaline earth metals with hydrogen ions and the resultant hydrogen solid thereafter neutralized with an azo amine.

Substitution of hydrogen for the alkali or alkaline earth metals in the naturally occurring clays and zeolites can be accomplished simply by acid washing the solid. In this method, known to those skilled in the art, the solid is treated with a dilute mineral acid such as hydrochloric, nitric, phosphoric, sulfuric, etc., and thereafter separated from the excess of the acid by settling filtration, etc.

The clay or zeolite can also be converted to the hydrogen form by passing a suspension of the solid over a hydrogen charged ion exchange column such as an Amberlite IR-120. The resultant hydrogen clay or zeolite can thereafter be reacted with the amine azo or nitroso compound in a manner hereafter described.

The organic addent to the aforedescribed ion exchange solid comprises at least two functional groups; an ammonium group for bonding to the ion exchange solid and an azo or nitroso group to generate a free radical.

The quaternary ammonium group of the azo compound can be prepared from the corresponding amine simply by addition of an acid, such as hydrochloric, acetic, phosphoric, nitric, sulfuric, etc., to a solution of the amine in a suitable solvent. In lieu of a dilute acid, alkyl halides, phosphates, nitrates or sulfates can be added to the amine such as methyl chloride, isopropyl bromide, triethyl phosphate, butyl nitrate, methyl sulfate, etc.

The free radical generating group is an azo group. In general, organic azo compounds of alkyl compounds are useful, and preferably, such compounds have the azo nitrogens bonded to carbons of alkyl groups with at least one and, most preferably, both of the carbon atoms vicinal to the azo nitrogen being secondary or tertiary. To form a bond to the ion exchange solid, it is also necessary that at least one and preferably both of the aliphatic groups contain an amine or quaternary ammonium radical, i.e., that one or both of these groups be an aminoalkyl radical.

Structurally, suitable organic azo compounds which can be quaternized and adducted with the ion exchange solids are as follows:

$$R_1-N=N-R_2$$

wherein:

At least one and preferably both $R_1$ and $R_2$ contains an amine group; and $R_1$ and $R_2$ are selected from the class consisting of alkyl, aralkyl and aminoaralkyl.

As previously mentioned, the preferred compounds are those having secondary or tertiary carbons vicinal to the azo nitrogen.

Representative of this class of bifunctional azo compounds are the following:

Where $R_1$ is aryl or alkaryl and $R_2$ is aminoalkyl or aminoaralkyl: phenylazomethylamine, phenylazopropylamine, 2-naphthylazomethylamine, p-tolylazobutyramidine, p-tolylazoisopropylamidine, p-tolylazophentylamidine, etc.

Where $R_1$ is alkyl or aralkyl and $R_2$ is aminoalkyl or aminoaralkyl: aminodiazomethane, methylazobutyramidine, 2-methylazoisopropylamine, α-ethylazo β-aminocumene, γ-methylazophenethylamine, etc.

Where $R_1$ is alkyl or aralkyl and $R_2$ is aminoaryl or aminoalkaryl: p-aminophenylazomethane, o-aminoxylylazoisopropane, 6-amino 2-naphthylazoethane, 2-(p-aminophenyl)-1-phenylethane, etc.

Where $R_1$ and $R_2$ contain amino agroups: azobiisobutyramidine, α,α'-azobis(p-quanyltoluene), azobiisopropylamine, azobismethylamidine, etc.

As previously mentioned, the organic addent can be readily converted from an amine to an ammonium salt by various methods apparent to those skilled in the art. The organic addent can be dissolved in a suitable inert solvent such as benzene, chloroform, methyl ethyl ketone, dichlorobenzene, formamide, dimethyl formamide, acetone, hexane, trichloroethane, cyclohexane, isopropyl acetate, ethyl propionate, toluene, amyl bromide, xylene, n-butyl ether, etc., and a dilute acid thereafter added. Suitable acids are hydrochloric, acetic, phosphoric, sulfuric, nitric, etc. If desired, the ammonium salt can be formed by addition of organic esters of mineral acids such as methyl sulfate, triethylphosphate, ethyl nitrate, etc. or alkyl halides such as methyl chloride, ethyl fluoride, etc.

By any of these methods the amine addent is converted to a salt which upon addition of water gives rise to quaternary ammonium cations. This is suitably accomplished by the addition of about 0.1 to 10 parts of water to each part of the organic solution. The solvent-water dispersion of quaternary ammonium addent is then added to a dispersion of the ion exchange solid, whereupon the free radical precursor of my invention is formed by conventional base exchange of the quaternary ammonium cations for the metal ions of the ion exchange solid.

In a preferred embodiment with a clay, the "as-received" clay is converted to its hydrogen form by a suitable treatment such as washing with an acid, e.g., hydrochloric, nitric, acetic, sulfuric, phosphoric, etc., and the resultant hydrogen clay is reacted with the amine addent. As previously mentioned the hydrogen clay can also be obtained by contacting an aqueous suspension of the clay with a hydrogen charged ion exchange resin.

The adducted ion exchange solid settles out of the aqueous suspension and is readily recovered by filtration. The solid can be purified of unreacted amine addent by washing with a suitable solvent for the amine, e.g., any of the aforementioned solvents.

The resultant organosolid comprises the organic free radical precursor, i.e., an azo group which is bonded to the ion exchange solid through an onium linkage. Typical of such organosolids are: azobisisobutylramidinium montmorillonite; azobisisobutyramidinium kaolin; and p-phenylazoamidinium halloysite aminoamidinum.

The organosolid materials so obtained are, in general, hydrophillic solids which can be filtered from the aqueous suspension used in their preparation, dried and powdered. At room temperatures, the solids are quite stable. Upon heating to slightly above room temperature, e.g., about 25° to about 125° C., however, the organic portion of the solid will decompose to liberate nitrogen and form free radical fragments, at least half of which are bonded to the solid by the ammonium linkage. These free radicals can be used as initiators for polymerizations and other chain propagating reactions in the manner that purely organic free radicals are used. In accordance with the standard practice, the decomposition of the azo compound to yield free radicals will, in general, be performed in an aqueous or organic suspension of the organosolid free radical precursor together with the reactants which are to be initiated into a reaction by such free radicals.

The organosolid free radicals generated by my invention are highly immobile and can not readily recombine with each other. With most of the solids, i.e., the ion exchange and non-swelling type clays; however, approximately half of the free radicals formed are organic fragments which are sufficiently mobile to recombine with the organosolid free radicals. Accordingly, the decomposition of the free radical precursor and formation of the free radicals should be performed in a medium which contains the reactants to be initiated so this initiation occurs before the fragments recombine. Those skilled in the art will recognize this technique as typical of the usual method for using organic free radical initiators.

When an azo compound which has an ammonium group on each side of the azo nitrogens is adducted with a swelling type clay, I have found that very stable immobile free radicals can be generated which can be stored for extended periods prior to use. While I do not wish to be bound by theory for this behavior, I believe that the diammonium azo compound base exchanges both ammonium groups onto ion exchange sites in the clay lattice so that upon decomposition, two organosolid free radicals are generated which can not recombine because of the rigidity of the clay lattice. The presence of free radicals can be detected in aqueous suspensions of the organosolid many hours after the complete decomposition of the azo compound, thus indicating that these radicals have, indeed, been stabilized by their base exchange to basal plane exchange sites of the clay.

I have further found that adduction with clay tends to increase the decomposition constant of typical azo compounds while the activation energy remains of the same order of magnitude. The following are typical results for the decomposition constant and activation energy of an azo compound, azobisisobutyamidine hydrochloride (AIBA) and two organoclays prepared with this compound, azobisisobutyramidinum montmorillonite (AIBAM) and azobisisobutyramidinum kaolin (AIBAK):

| Azo Compound | Temperature, °C. | $k \times 10^4$ (recip. sec.) | Activation Energy (kcal./mol) |
|---|---|---|---|
| AIBA | 60<br>70<br>75<br>80 | 0.37<br>1.32<br>2.58<br>5.13 | 30.8 |
| AIBAM | 60<br>70<br>80 | 1.19<br>3.21<br>10.40 | 25.2 |
| AIBAK | 50<br>60<br>70<br>80 | 0.137<br>0.720<br>2.28<br>9.52 | 32.1 |

The following examples will illustrate my invention:

EXAMPLE 1

Anhydrous hydrogen chloride gas was bubbled into a dispersion of 100 grams of 2,2'-azobisisobutyronitrile in 500 grams of absolute ethanol. The temperature was maintained at 5°–10° C. for 2½ hours and then the reactants were permitted to warm to room temperature. The clear solution which contained 358 grams of reacted hydrogen chloride was cooled to 5° C. and maintained at that temperature overnight. A crystalline solid formed and this solid was separated, washed with cold ethanol and dried. The yield was 207 grams of 2,2'-azobisisobutyrimido ethyl ester hydrochloride.

To a cold slurry of 200 grams of the imido ester in 120 grams of absolute ethanol, was added a cold solution of 60 grams of ammonia in ethanol. The mixture was warmed to 25° C. and thereafter maintained at room temperature for 16 hours. A crystalline product was formed which was filtered, washed and air dried at 25° C. The total weight of solid 2,2'-azobisisobutyromidine hydrochloride was 118 grams. The compound was water soluble and had the following analysis: carbon 36.8 percent, chlorine 26.4 percent and nitrogen 31.0 percent. These results corresponded to the calculated amounts for azobisisobutyramidine dihydrochloride which are: carbon 35.4; chlorine 26.1; and nitrogen 30.9.

EXAMPLE 2

Aniline (14 grams) and concentrated hydrochloric acid (24 grams) are stirred into 75 milliliters of water and the mixture cooled to 0° C. by the addition of 50 grams of ice. Over a 10-minute period, 5.2 grams of sodium nitrite are added. After 30 minutes, 21 grams of sodium acetate are added and a yellow precipitate of diazoaminobenzene is formed. The solid is recovered by filtration and is dissolved in 45 grams of aniline containing 7.5 grams of aniline hydrochloride. This mixture is warmed to 40°–45° C. for one hour and thereafter 45 milliliters of 50 percent aqueous acetic acid is added. A yellow solid is formed which is filtered and found to be p-aminoazobenzene.

EXAMPLE 3

To an aqueous suspension of 62 grams of kaolin in two liters of water was added 0.40 gram of the azobisisobutyramidine hydrochloride prepared in Example 1. The suspension was stirred, stored overnight and thereafter the solids were recovered by filtration and washed with distilled water. The solids were analyzed and found to contain 0.12 percent carbon, 0.012 percent chlorine and 0.2 percent nitrogen (Dumas).

EXAMPLE 4

An aqueous solution of the azobisisobutyramidine hydrochloride was slowly added to two liters of distilled water containing 40 grams of suspended bentonite until the clay flocculated. The flocculated solid was then filtered and the filter cake was washed with several portions of distilled water. The cake was dried in air to yield a leathery appearing solid which was dispersed in methanol, filtered and dried under a nitrogen vacuum at 45° C. The solid was analyzed and found to contain 2.9 percent carbon and 1.33 percent nitrogen (Kjeldahl). The X-ray diffraction pattern revealed the organoclay solid to have a $C_0$ axis spacing of 13.7 A.

EXAMPLE 5

A twenty gram portion of montmorillonite was dispersed in 800 milliliters of distilled water. Then, 0.9005 gram of azobisisobutyramidine hydrochloride was added and the resultant dispersion of organoclay was heated to 70° C. Nitrogen ceased to be evolved from the sample after 202 minutes at 70° C. Thereafter the dispersion was kept under a nitrogen atmosphere at 70° C. and 100 milliliter samples were withdrawn after 1, 23 and 95 hours. To each of the withdrawn samples was added 5 grams of methyl methacrylate. The remainder of the aqueous dispersion of free radical organoclay dispersion was stored an additional 73 hours at 70° C. and thereafter 25 grams of methyl methacrylate was added at 70° C.

Each of the mixtures of methyl methacrylate and free radical organoclay dispersions were stirred for one hour at 70° C. and the solids were separated by filtration, washed, dried and extracted with benzene to remove the polymethyl methacrylate which was not bonded to the clay.

The following table summarizes these results and also presents the results (Sample 1) from a polymerization in which the decomposition of 20 grams of azo-montmorillonite was conducted by heating to 99° C., cooling to 78° C. in 10 minutes followed by addition of 50 grams of methyl methacrylate.

*Table 1*

| Sample No. | Storage Period of free radical [1] (hours) | Polymer in unextracted solid (Wt. Percent) | Extracted Polymer (grams) |
|---|---|---|---|
| 1 | [2] 10 | 60.0 | 6.0 |
| 2 | 1 | 34.0 | 0.3402 |
| 3 | 23 | 3.0 | Trace |
| 4 | 95 | 4.43 | None |
| 5 | 168 | 6.1 | Trace |

[1] Time interval between complete azo decomposition and addition of the monomer.
[2] Minutes.

In this experiment, the benzene soluble polymer was formed by initiation with completely organic isobutyramidinium chloride free radicals, whereas the benzene insoluble polymer was formed by initiation with isobutyramidinium montmorillonite to result in a polymer chain which propagated from the clay surface.

When an aqueous dispersion of methyl methacrylate is held at 70° C. for one hour, in the absence of any catalyst or initiator, no appreciable polymerization occurs. When an aqueous dispersion of the azobisisobutyramidinium montmorillonite is held at 5° C. to preclude azo decomposition, no polymerization occurs when methyl methacrylate is added.

The preceding example amply demonstrates that the organoazo-solid compositions of my invention are very effective free radical precursors which can be decomposed to yield free radicals which exist for prolonged periods without recombination. In particular, the very rapid decrease in the extracted polymer between samples 1, 2 and 3 demonstrates the great rate of decomposition exhibited by the completely organic—and therefore highly mobile—free radicals. The combined, organosolid free radicals, however, can not readily recombine and, therefore, even after one hour a very large amount of unextractable polymer was formed.

EXAMPLE 6

To illustrate the effectiveness of an organoazo-solid as a free radical source even at room temperature, 50 grams of the kaolin adduct of azobisisobutyramidine hydrochloride, 50 grams of freshly distilled methyl methacrylate and two drops of a surfactant, Igepal CO-630 were admixed into 232 milliliters of distilled water. The mixture was stirred under a nitrogen atmosphere for 4 hours at 23.2°–24.5° C. Thereafter, the solids were filtered, washed with methanol, filtered and extracted with acetone, then soxhlet extracted with benzene for 16 hours. The benzene insoluble residue was a rubbery material. The solids were pulverized in a Waring blendor and again extracted with benzene to remove all traces of uncombined organic polymer. The solid was analyzed for carbon and the amount of polymer adducted with the clay was 2 weight percent of the solid.

When the experiment was repeated with 0.15 gram of azobisisobutyramidine hydrochloride in lieu of the 50 grams organoazo kaolin which contained 0.15 gram of combined azo compound, no polymer was formed after 4 hours at 25° C.

The preceding examples are intended solely to illustrate my invention and are not to be construed as unduly limiting thereof. My invention is intended to be defined as the compositions and their obvious equivalents expressed in the following claims.

I claim:
1. A solid free radical precursor consisting essentially of a clay having an ion exchange capacity of at least about 0.1 milliequivalent per 100 grams bonded through a nitrogen onium group selected from the class consisting of ammonium and amidinium groups to an organic compound containing an azo group capable of homolytic fission upon being to a temperature between 25° and 125° C. to yield a free radical, said organic compound having the following structure:

$$R_1N=NR_2$$

wherein:
at least one of said $R_1$ and $R_2$ contains said nitrogen onium group selected from the class consisting of ammonium and amidinium groups and said $R_1$ and $R_2$ are selected from the class consisting of alkyl, aminoalkyl, aralkyl, and aminoaralkyl wherein said alkyl group is a lower molecular weight alkyl group and wherein said aralkyl group is a phenyl lower molecular weight alkyl group or a naphthyl lower molecular weight alkyl group and wherein the carbon atoms of said $R_1$ and $R_2$ vicinal to the azo nitrogen atoms are secondary or tertiary aliphatic carbons.

2. The composition of claim 1 wherein said $R_1$ and $R_2$ groups have no more than a single hydrogen bonded to the carbon atoms vicinal to the azo nitrogen atoms.

3. The composition of claim 1 wherein one of said $R_1$ and $R_2$ is amino alkyl and the other of said $R_1$ and $R_2$ is alkyl.

4. The composition of claim 1 which comprises montmorillonite amidinium isobutyl free radical.

5. The composition of claim 1 wherein said $R_1$ and $R_2$ are amino alkyl groups.

6. The composition of claim 5 wherein $R_1$ and $R_2$ are amidine alkyl groups.

7. The composition of claim 1 wherein said solid is an aluminum silicate.

8. The composition of claim 7 wherein said aluminum silicate is an expanding lattice clay.

9. The composition of claim 7 which comprises the adduct of azobisisobutyramidine and montmorillonite.

10. The composition of claim 7 which comprises the adduct of azobisisobutyramidine and kaolin.

11. A stabilized organic free radical chemically bonded by a nitrogen onium group selected from the class consisting of ammonium and amidinium groups to the ion exchange sites of an expanding lattice clay having an ion exchange capacity greater than about 0.1 milliequivalent per 100 grams; said onium group being also bonded to said organic free radical and said free radical having a terminal carbon bearing an unshared electron in its valence shell and being alkyl or aralkyl wherein said alkyl group is a lower molecular weight alkyl radical and said aralkyl group is a phenyl lower molecular weight alkyl radical or a naphthyl lower molecular weight alkyl radical.

References Cited by the Examiner
UNITED STATES PATENTS

| | | | |
|---|---|---|---|
| 2,188,889 | 1/1940 | Clocker | 260—414 |
| 2,425,286 | 8/1947 | Thurston et al. | 260—153 |
| 2,428,108 | 9/1947 | McQueen | 260—310 |
| 2,531,396 | 11/1950 | Carter et al. | 260—41.5 |
| 2,599,299 | 6/1952 | Upson | 260—192 |
| 3,190,870 | 6/1965 | Elkins | 260—141 X |

FOREIGN PATENTS 817,001  7/1959  Great Britain.

OTHER REFERENCES

Dougherty: "J. Am. Chem. Soc.," vol. 83, pp. 4849–4853 (1961).

CHARLES B. PARKER, *Primary Examiner*.

R. J. FINNEGAN, F. D. HIGEL, *Assistant Examiners*.